United States Patent [19]
Habbab et al.

[11] Patent Number: 5,187,610
[45] Date of Patent: Feb. 16, 1993

[54] LOW NOISE, OPTICAL AMPLIFIER HAVING POST-AMPLIFICATION LOSS ELEMENT

[75] Inventors: Isam M. I. Habbab, Old Bridge; Adel A. M. Saleh, Holmdel, both of N.J.

[73] Assignee: AT&T Bell Laboratories, Murray Hill, N.J.

[21] Appl. No.: 810,273

[22] Filed: Dec. 19, 1991

[51] Int. Cl.$^5$ ............................. A01S 3/05; G02B 6/26
[52] U.S. Cl. ................................. 359/341; 359/337; 372/33
[58] Field of Search .................... 359/337–341; 372/33

[56] References Cited

U.S. PATENT DOCUMENTS

| | | | |
|---|---|---|---|
| 3,317,848 | 5/1967 | Keyes | 359/337 |
| 3,774,120 | 11/1973 | Ross | 372/33 |
| 3,949,315 | 4/1976 | Zeidler | 359/337 |
| 4,947,134 | 8/1990 | Olsson | 359/341 |
| 4,954,786 | 9/1990 | Yamakawa et al. | 359/337 |
| 4,971,417 | 11/1990 | Krinsky et al. | 359/341 |
| 5,067,789 | 11/1991 | Hall et al. | 359/341 |

OTHER PUBLICATIONS

Habbab et al, J. Lightwave Technol., vol. 9, #10 pp. 1321–1329, Oct. 1991.

S. Kobayashi et al., *IEEE Spectrum*, May 1984, "Semiconductor Optical Amplifiers," pp. 26–33.

S. Saito et al., *Electronics Letters*, May 10, 1990, vol. 26, No. 10, "Coherent Transmission Experiment over . . . ," pp. 669–671.

P. C. Becker, *Laser Focus World*, Oct. 1990, "Erbium-doped Fiber Makes Promising Amplifiers," pp. 197–203.

P. Urquhart, *IEE Proceedings*, vol. 135, Pt. J., No. 6, Dec. 1988, "Review of rare earth doped fibre . . . ," pp. 385–407.

*Primary Examiner*—Nelson Moskowitz
*Attorney, Agent, or Firm*—Gregory C. Ranieri

[57] ABSTRACT

In an optical arrangement for amplifying an input lightwave signal by a predetermined amount to a desired output level, an optical amplifier is connected to a loss element. The optical amplifier is pumped by an amount exceeding a nominal amount wherein the nominal amount is the amount of pumping needed to attain the desired output level at the optical amplifier output. By attenuating the signal output from the optical amplifier, the loss element generates an output signal from the optical arrangement at the desired output level. This optical arrangement is characterized by an improved noise performance (noise figure) over standard optical amplifiers.

20 Claims, 8 Drawing Sheets

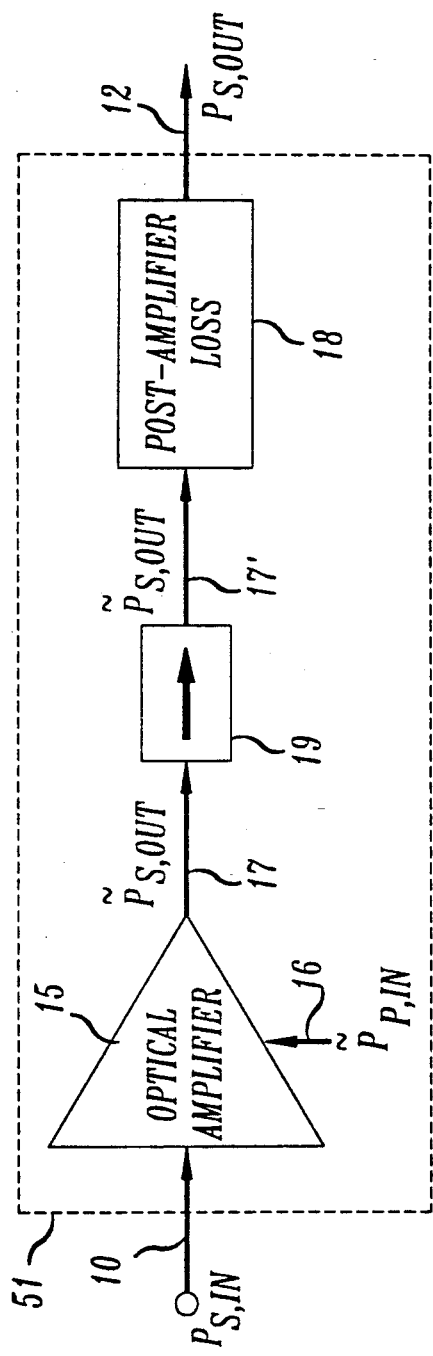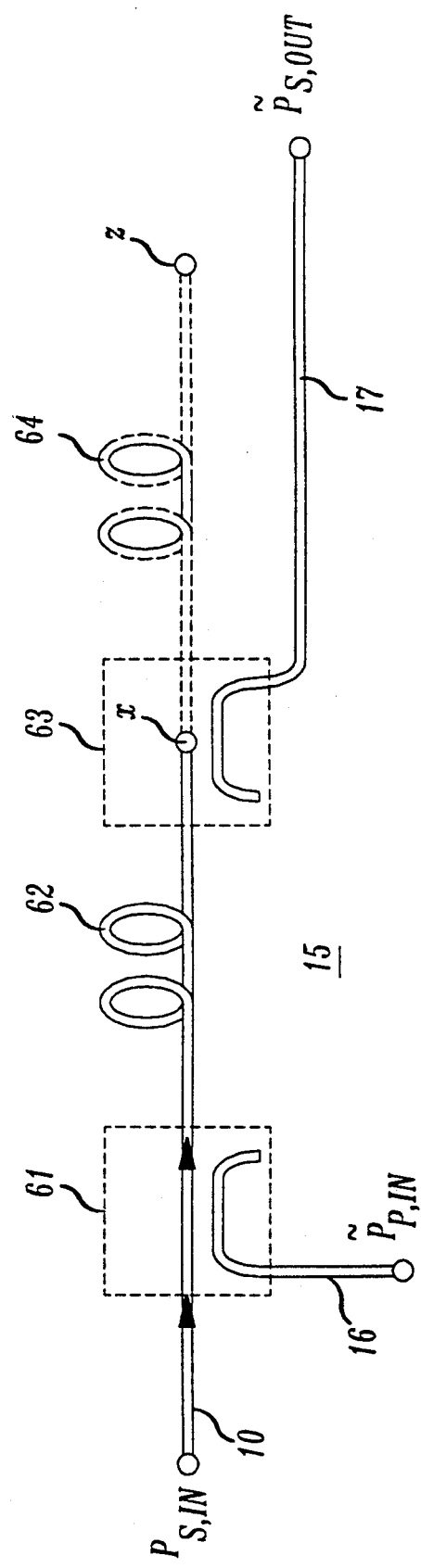

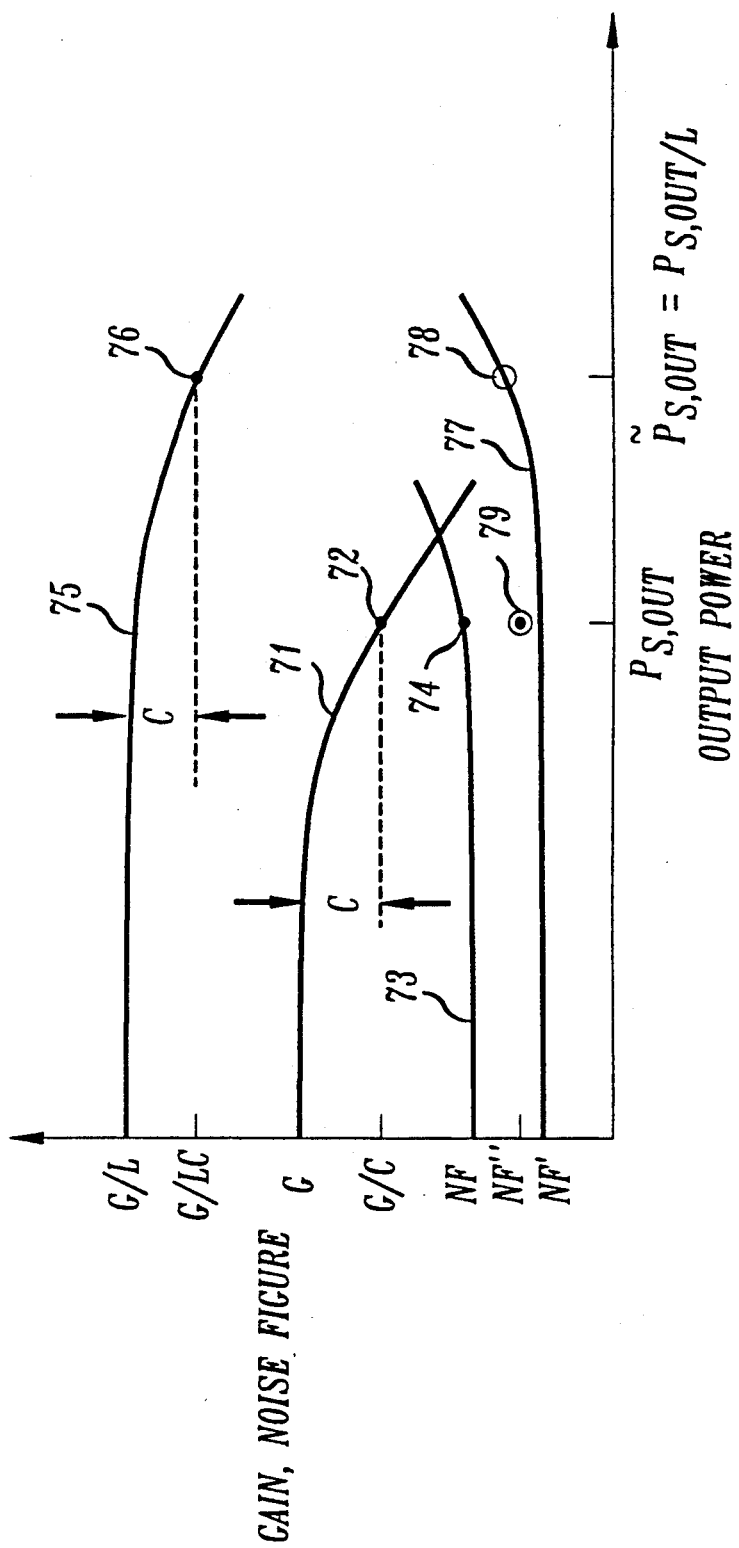

LOW NOISE, OPTICAL AMPLIFIER HAVING POST-AMPLIFICATION LOSS ELEMENT

TECHNICAL FIELD

This invention relates to the field of optical devices and, more particularly, to optical devices which provide lightwave signal amplification.

BACKGROUND OF THE INVENTION

Some long-haul lightwave communication systems rely on a chain of optical amplifiers to boost the lightwave signal power to a level sufficient for the signals to traverse the entire system. Such lightwave systems are carefully specified to have sufficient amplifier gain, proper amplifier output power, and correct amplifier compression. The system parameters mentioned above, together with all other system parameters, ensure that the resulting lightwave communication system operates as expected, usually, in accordance with a desired signal-to-noise ratio performance. Of course, it is the signal-to-noise performance of a lightwave communication system which is affected by such factors as amplifier gain, output power, and compression.

Amplifier gain is generally set at an appropriate level for compensating effectively intrinsic loss of optical fiber in the span between two adjacent amplifiers. Amplifier output power is usually established between maximum and minimum power levels. The maximum power level is that level below which nonlinear effects in the optical fiber do not significantly distort the lightwave signals; the minimum power level is that level required to traverse the optical fiber span between amplifiers while maintaining an adequate signal-to-noise ratio. Compression is the amplifier parameter which determines the degree to which the amplifier operates in saturation. When a chain of amplifiers in a lightwave system are operated in compression, the system is self-stabilizing with respect to slight signal power or amplifier fluctuations.

In present lightwave communication systems, specified amplifier output power, gain, and compression prohibit the use of sufficient amplifier pump power to effectively and uniformly invert the amplifier gain medium. This, in turn, gives rise amplifier element designs and loss element designs to meet the prescribed criteria of gain, output power, and compression for the arrangement.

In an illustrative embodiment, a doped-fiber amplifier is optically coupled to a loss element to realize the optical arrangement. Counter-propagating or copropagating pump signals or a combination of both types of pump signals are employed for pumping the amplifier.

BRIEF DESCRIPTION OF THE DRAWING

A more complete understanding of the invention may be obtained by reading the following description of specific illustrative embodiments of the invention in conjunction with the appended drawing in which:

FIG. 5 shows the amplifier of FIG. 4 including an optical isolator;

FIG. 6 shows a more detailed schematic drawing of an alternative embodiment for the optical amplifier element in FIGS. 4 and 5;

FIG. 7 is a comparative plot of gain and noise figure versus output power for the embodiments in FIGS. 2 and 4.

DETAILED DESCRIPTION

Figure 1:
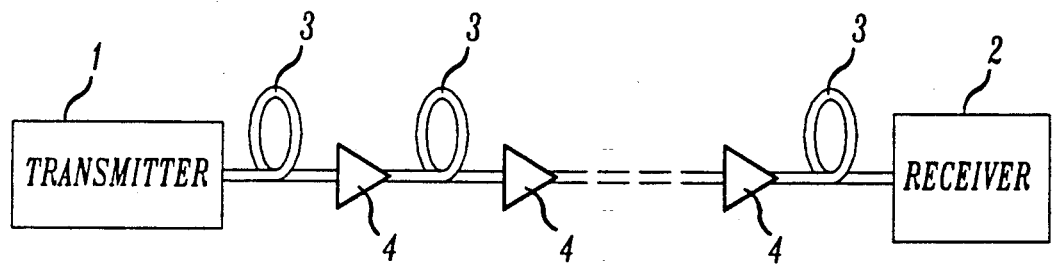
FIG. 1 shows a simplified block diagram of a lightwave communication system utilizing a chain of optical amplifiers.

A lightwave transmission system is shown in FIG. 1 having a concatenated amplification chain. The system includes a chain of optical amplifiers 4 and interconnecting spans of optical fiber 3 for serving as lightwave transmission media to interconnect the amplifiers so that lightwave transmitter 1 is connected ultimately with lightwave receiver 2. Each span of optical fiber has a particular intrinsic loss at the wavelength of operation for the system. The fiber intrinsic loss is generally compensated by the gain of the preceding optical amplifier. Systems such as the one depicted in FIG. 1 are expected to cover distances from hundreds of meters in a building environment to many thousands of kilometers in transcontinental and transoceanic applications.

For the system in FIG. 1, optical amplifiers are realizable as semiconductor or doped optical fiber apparatus. It will be apparent to persons skilled in the art after reading the following description that the principles of the present invention are equally applicable to semiconductor optical amplifiers and doped optical fiber amplifiers. For uniformity and ease of understanding in the following description, the particular exemplary embodiment described is that of the doped optical fiber amplifier which is optically pumped. In order to understand the following description in terms of semiconductor optical amplifiers, it is recognized that pumping is accomplished by either optical means or, as is more usually the case, electronic means. Details about the operation and fabrication of semiconductor optical amplifiers are well known to persons skilled in the art and are also disclosed in a tutorial article in *IEEE Spectrum*, pp. 26-33 (May 1984). Details about the operation and fabrication of doped optical fiber amplifiers and, especially, erbium doped optical fiber amplifiers are also well known in the art and are not described below.

Figure 2:
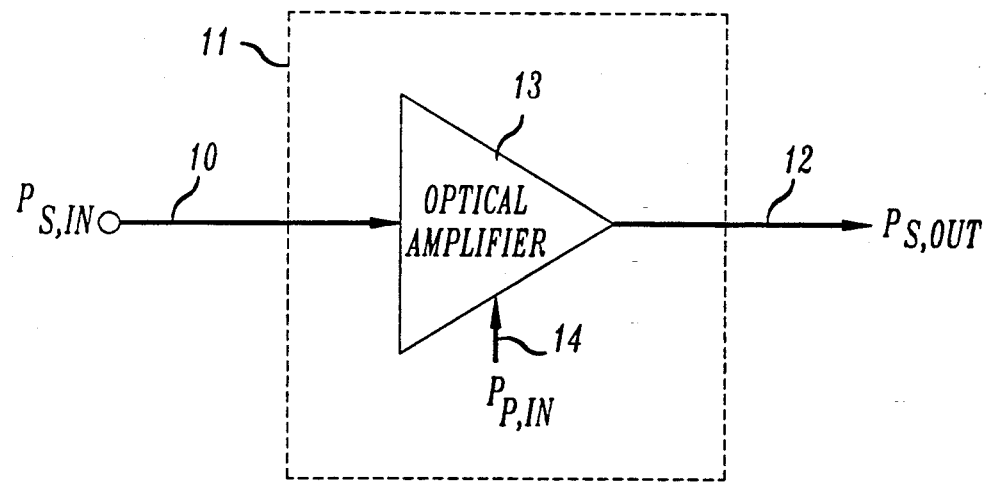
FIG. 2 shows a more detailed schematic drawing of an optical amplifier.
Figure 3:
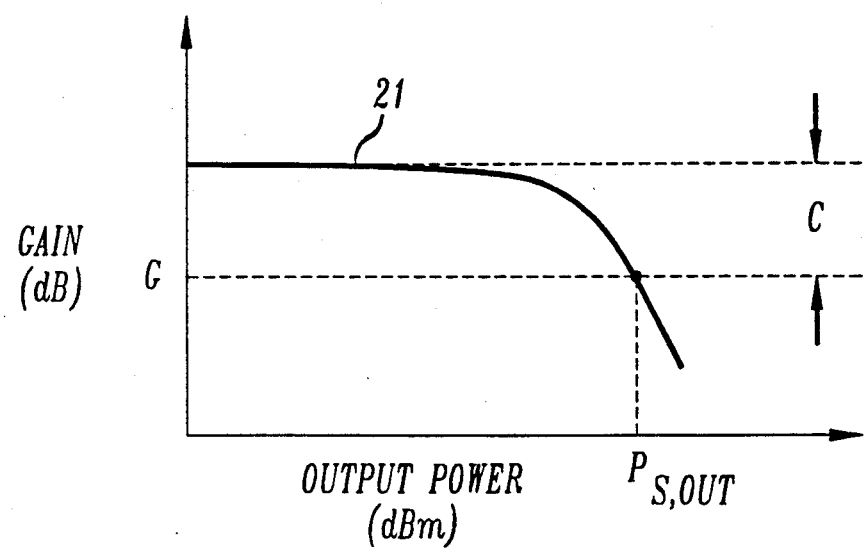
FIG. 3 shows a gain characteristic plot for the exemplary amplifier shown in the previous figure.

The optical apparatus shown in FIG. 2 as dashed box 11 is capable of being substituted for each optical amplifier 4 in FIG. 1. Optical amplifier 13 amplifies an input signal $P_{s,in}$ received via input fiber 10. The output signal, $P_{s,out}$, from optical amplifier 13 is supplied on output fiber 12. Optical amplifier 13 is pumped by a supplied pump signal $P_{p,in}$ at pump input 14. The power of the pump signal is designed to achieve the desired gain (G) and compression (C) for optical amplifier 13. Gain characteristic curve 21 as shown in FIG. 3 illustrates the relationship of gain, compression, and output signal power for optical amplifier 13. It is understood that the classical amplifier relationship applies here as follows: $P_{s,in} = P_{s,out}/G$.

For a doped optical fiber amplifier such as an erbium doped fiber amplifier, pump input 14 permits the pump signal to be introduced into optical amplifier 13 for either co-directional or contra-directional pumping with respect to the signal being amplified. That is, $P_{p,in}$ propagates along with (co-directional), or opposite to (contradirectional), the input signal $P_{s,in}$.

It has now been discovered that both the amplifier length and the pump power are uniquely determined when the output signal power, gain, and compression are specified for an optical amplifier. In addition, it has been found that the choice of output signal power, gain, and compression may result in an optical amplifier which is not realizable. When the unique amplifier is specified by output signal power, gain, and compression, it is realized having a certain fixed noise performance which is the amplifier noise factor. That is, there is no flexibility or adjustable parameter within the optical amplifier for improving the noise performance of the amplifier.

In order to determine the required pump power and amplifier length that meet the specifications on output signal power, gain, and compression for the amplifier, it is necessary to solve the following equations. The first equation which is solved for the pump input power is as follows:

$$\alpha_s \ln\left[\frac{Q_{p,in}}{Q_{p,0,out}}\right] +$$

$$(Q_{p,in} - Q_{p,0,out})\left(\frac{\alpha_s}{Q_{p,IS}} - \frac{\alpha_p}{Q_{s,IS}}\right) = -\alpha_p \ln G_{ss},$$

where $\alpha_s$ and $\alpha_p$ are the wavelength-dependent absorption constants at the respective signal and pump wavelengths, $G_{ss}$ is the small signal gain given by the product $GC$, $Q_{p,IS}$ and $Q_{s,IS}$ are the wavelength-dependent intrinsic saturation powers of the amplifier at the pump and signal wavelengths, respectively, $Q_{p,in}$ is the input pump power, and $Q_{p,O,out}$ is the output pump power in the absence of signal. It should be noted that Q is used rather than P to denote optical power as measured in photons per second. When the pump input power has been solved from the equation above, it is used to obtain the amplifier length.

Amplifier length, 1, is determined using the pump input power as follows:

$$\ln G_{ss} = -\alpha_s l + \frac{Q_{p,in}}{Q_{s,IS}} - \frac{Q_{p,0,out}}{Q_{s,IS}}.$$

Amplifier length for a doped optical fiber amplifier is substantially the length of the doped fiber. The amplifier length and pump input power determined from the equations above define the optical amplifier which, if realizable, meets the amplifier specifications of output signal power, gain, and compression.

In order to determine whether the optical amplifier is even realizable, the design parameters are substituted into the following equation;

$$P_{s,out} > \frac{G}{G-1} P_{s,IS} \ln C$$

which is reducible for high gain amplifiers to, $$P_{s,out} > P_{s,IS} \ln C.$$

As described above, the noise performance of the amplifier characterized by the amplifier noise figure is prescribed without any ability to modify or improve it. The noise figure is defined as $10 \log_{10} 2n_{sp}$, where $n_{sp}$ is the population inversion coefficient for the optical amplifier. Under uniform inversion conditions, the population inversion coefficient or spontaneous emission factor is given by $N_2/(N_2-N_1)$, where $N_1$ and $N_2$ are the respective ground and excited state populations for the gain medium in the optical amplifier.

In accordance with the principles of the present invention, it is now possible to improve the noise performance of an optical amplifier while concurrently meeting the amplifier design criteria for output signal power, amplifier gain, and compression. These benefits are obtained by combining an optical amplifier element with a post-amplification loss element and by pumping the optical amplifier element to produce a higher gain and, therefore, a larger output signal power which is substantially compensated by the post-amplifier loss element. Compensation by the post-amplifier loss element causes the combination of elements to produce an output signal power which meets the design criterion.

Figure 4:
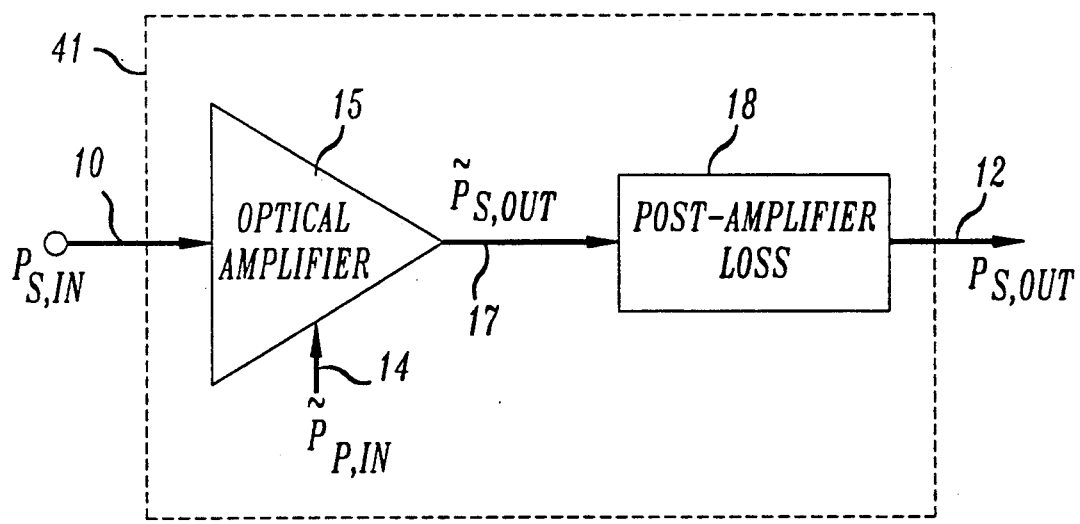
FIG. 4 shows a schematic diagram of an optical amplifier having a post-amplification loss element realized in accordance with the principles of the present invention.

One embodiment realized in accordance with the principles of the invention is shown in FIG. 4. In this embodiment, optical apparatus 41 includes optical amplifier element 15 and post-amplifier loss element 18. Optical apparatus 41 is capable of being substituted for each optical amplifier 4 in FIG. 1. Optical amplifier element 15 is pumped either co-directionally or contra-directionally or both co-directionally and contra-directionally via pump input 14 using pump input signal $P_{p,in}$, where $P_{p,in}$ is greater than $P_{p,in}$. For the latter case of bidirectional pumping, two separate positions are required for pumping the amplifier element. The source of the pump signal, although not shown in FIG. 4, is a light source such as a laser having a sufficient output optical power at the appropriate wavelength for pumping optical amplifier 15. For erbium doped optical fiber amplifiers, suitable pump wavelengths occur in the vicinity of 980 nm and in the range of wavelengths from 1460 nm to 1480 nm for amplifying lightwave signals propagating at approximately 1500 nm. Of course, the aforementioned wavelengths are merely illustrative and are not to be interpreted for purposes of limitation.

Optical amplifier element 15 is optically coupled to post-amplifier loss element 18 via fiber, waveguide, lens, or other optical coupling element on optical path 17. The output from optical amplifier 15 is output signal $P_{s,out}$ which is a larger output signal power than the design criterion $P_{s,out}$. In order to compensate the additional output signal power, post-amplifier loss element 18 provides an optical loss L such that the total gain for the optical apparatus 41 is the product of the optical loss of element 18 and the gain of optical amplifier 15. As a result, optical apparatus 41 exhibits an overall gain which is substantially identical to the gain for the amplifier in FIG. 2 because the gain for either embodiment is $P_{s,out}/P_{s,in}$.

Post-amplifier loss element 18 is realizable as any one of a variety of passive and even active optical elements. For example, a fiber-to-fiber coupler having an intentional misalignment between the two fibers to cause the desired amount of loss, L, is one contemplated implementation for loss element 18. Curvature or bending of an optical fiber or dielectric waveguide subjects the lightwave signal to controllable amounts of loss as a function of the radius for the curve or bend which loss is sufficient to realize the post-amplifier loss element.

Lightwave attenuation devices which include leaky or weakly guiding optical fibers and dielectric waveguides provide another class of loss element. Passive and active (electrically controllable) directional optical couplers provide a fixed or adjustable amount of loss to the lightwave signal on the straight-through waveguide path by coupling a portion of the signal to the adjacent crossover waveguide path. Variable amplitude optical modulators are also useful for attenuating the output signal from the optical amplifier element by the desired loss amount, L. All devices described above for realizing the post-amplifier loss element have been disclosed in the technical literature and are known to persons skilled in the art.

Post-amplifier loss element 18 is preferably realized as a passive loss element having no nonlinear distortion. In addition, it is desirable for loss element 18 to inhibit or effectively reduce reflections back toward optical amplifier element 15. Anti-reflective coatings and the like are suitable for minimizing and substantially eliminating such reflections. Alternatively, an optical isolator inserted between the optical amplifier element and the post-amplifier loss element also minimizes and even eliminates the reflections toward optical amplifier element 15. This embodiment is shown in FIG. 5 wherein optical isolator 19 is inserted before loss element 18 to provide a substantially unidirectional optical propagation from optical amplifier element 15 to loss element 18. Optical isolators of this type are commercially available and will not be described in further detail.

FIG. 6 shows an alternative embodiment for optical amplifier element 15. Optical amplifier element 15 is shown to include optical couplers 61 and 63 and an amplifying fiber comprising doped optical fiber 62 and doped optical fiber 64. The pump signal is coupled into optical amplifier element 15 via waveguide or fiber 16; the optical input signal is coupled into optical amplifier element 15 via waveguide or fiber 10. Output from optical amplifier element 15 is provided via waveguide or fiber 17.

Optical coupler 61 couples the pump signal, $P_{p,in}$, into the waveguide path with $P_{s,in}$ so that the gain medium in doped optical fiber 62 is sufficiently inverted for amplifying the input signal. Optical coupler 63 permits the amplified input signal to be extracted from the optical amplifier element after the input signal has traversed a predetermined length of the doped amplifying fiber 62. The predetermined length of doped amplifier fiber is shown in FIG. 6 as substantially length x. Optical coupler 63 may be a tap or coupling device capable of operating in either a broadband mode or a narrowband mode. It is preferable to use a narrowband, wavelength selective coupler for coupler 63 in order to substantially eliminate further propagation of the pump signal into the output of optical amplifier element 15.

As shown in FIG. 6, the pump signal is applied to optical amplifier element 15 for co-directional pumping. Contra-directional pumping is accomplished by placing an optical coupler similar to coupler 61 at the opposite end of doped optical fiber 62 near coupler 63.

Optical coupler 63 is coupled to the doped optical fiber substantially at distance x measured from the input end of the doped fiber. This arrangement permits the optical amplifier element to provide the same compression level C in response to the higher pump power $P_{p,in}$ as the compression obtained from pumping the longer doped fiber comprising fibers 62 and 64 of length z with pump power $P_{p,in}$. For the longer fiber of length z being pumped at a higher pump power $P_{p,in}$, the compression is greater than the specified compression level C as a result of the higher pump power. Compression is reduced while maintaining a higher pump power by coupling the amplified input signal out of the doped amplifying fiber after a distance x which is less than the distance z. It is instructive to view coupler 63 as a slidable tap which couples light out of the doped amplifying fiber comprising fibers 62 and 64 for a total length z of fiber. In practice, however, it is contemplated that the compression parameter is equally well attained by physically shortening the total length of the doped amplifying fiber from length z to length x. By maintaining the specified compression level, it is then possible to meet the amplifier design parameters concerning compression, amplifier gain, and output power.

An illustration of the differences between the prior art optical amplifier and the arrangement of the present invention is shown in FIG. 7. Characteristics of the optical amplifier from FIG. 2 are plotted in curve 71 for gain and curve 73 for noise figure with the respective operating points 72 and 74 related to the specified output power $P_{s,out}$. Characteristics of the optical amplifier element in FIG. 4 are plotted in curve 75 for gain and curve 77 for noise figure with the respective operating points 76 and 78 for the optical amplifier element related to the higher output power $P_{p,in}$. Compression for the prior art amplifier and the optical amplifier element of the inventive arrangement is fixed to the specified parameter C. By adding the post-amplification loss element to the optical amplifier arrangement, the operating points for the arrangement become point 72, which has the specified gain G, and point 79, which has a lower noise figure at the specified output power $P_{s,out}$. The translation of the operating points in the present arrangement occurs because the post-amplification loss L causes a drop in gain by a factor L together with an output power reduction of L. Thus, the gain operating point moves down and left, each by a factor L, from point 76 to point 72 whereas the noise figure moves only left from point 78 to point 79.

Figure 8:
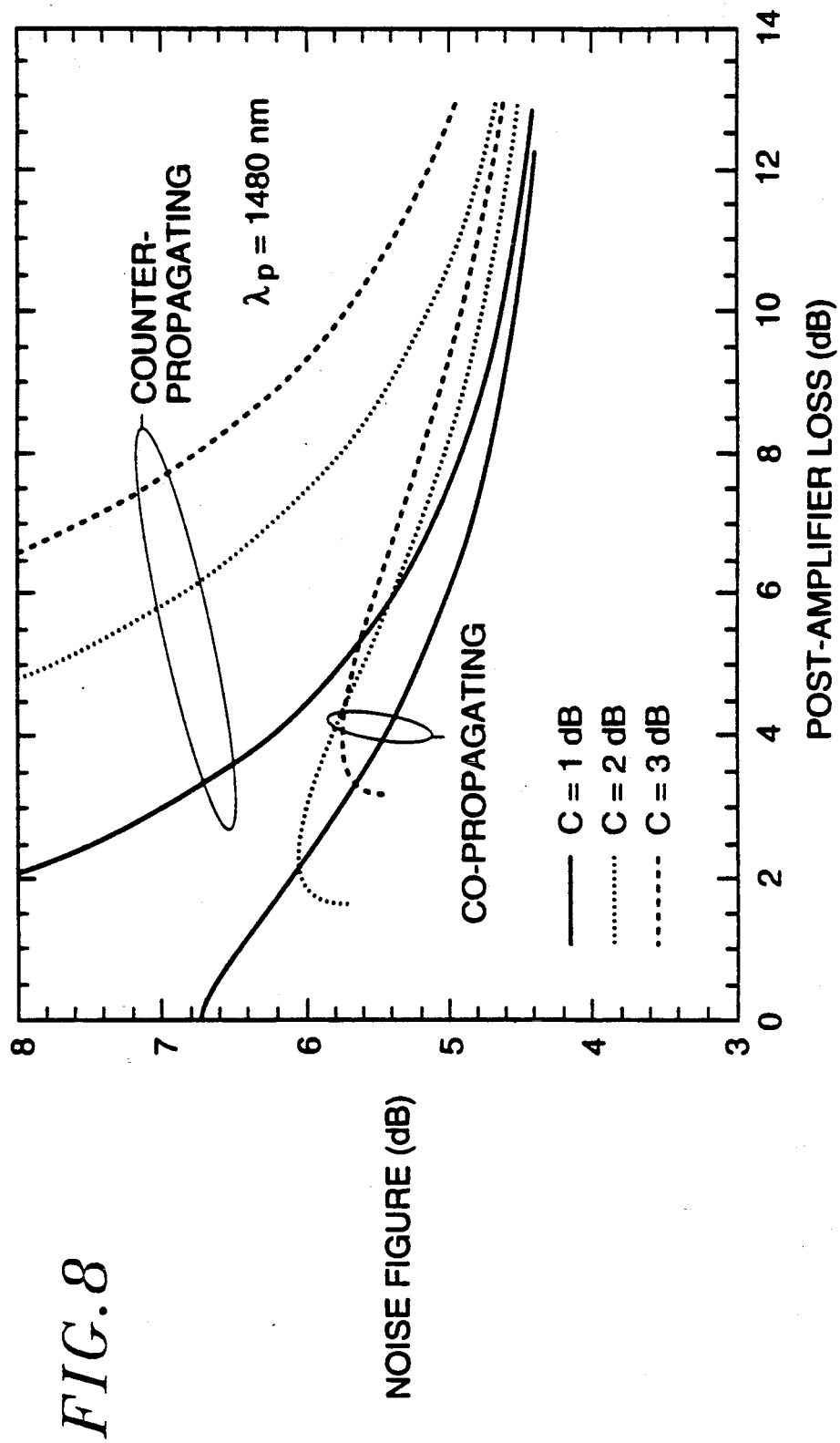
FIGS. 8-11 show plots of amplifier characteristics for varying post-amplifier loss and amplifier compression for the arrangement in FIG. 4.
Figure 9:
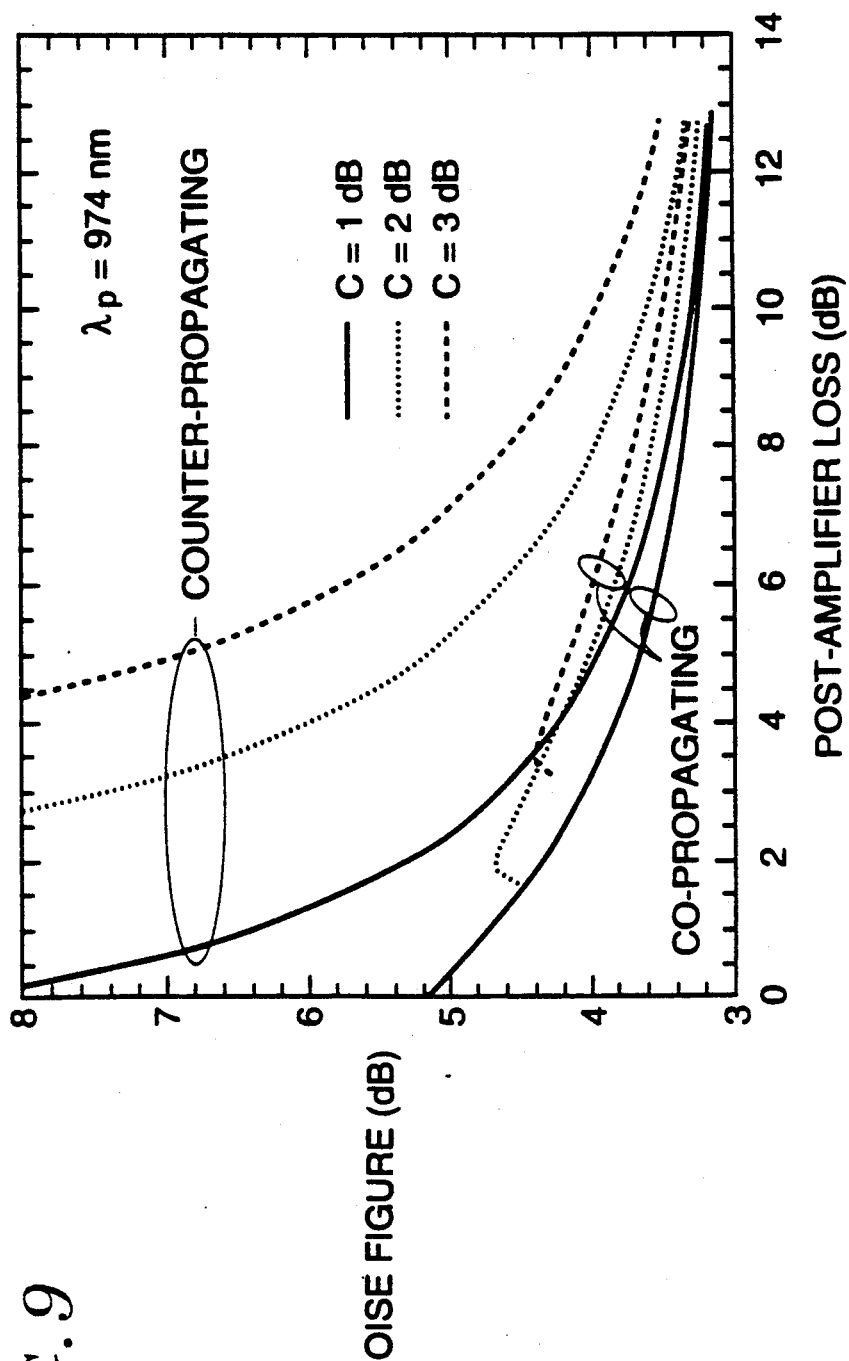
Figure 10:
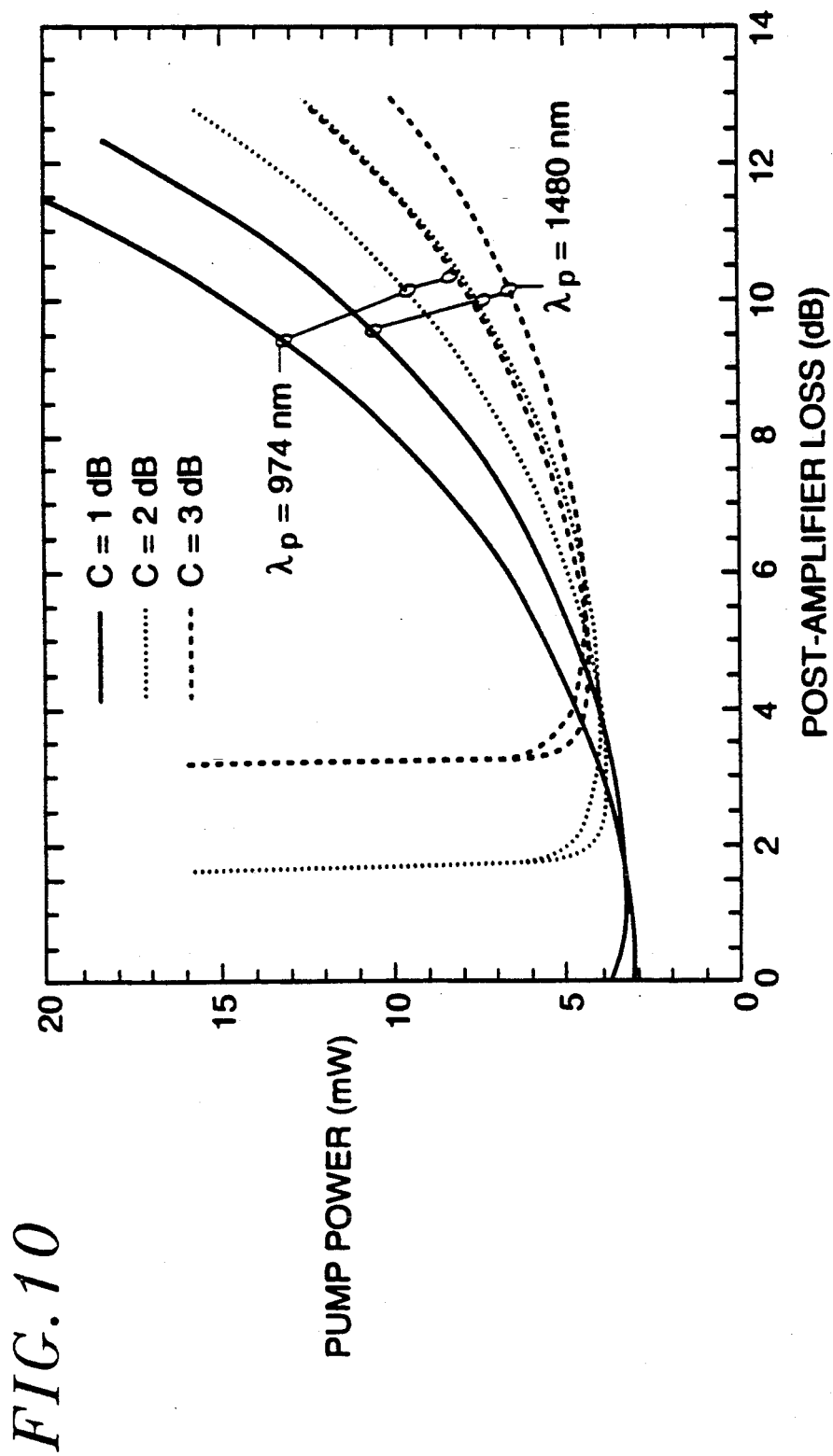
Figure 11:
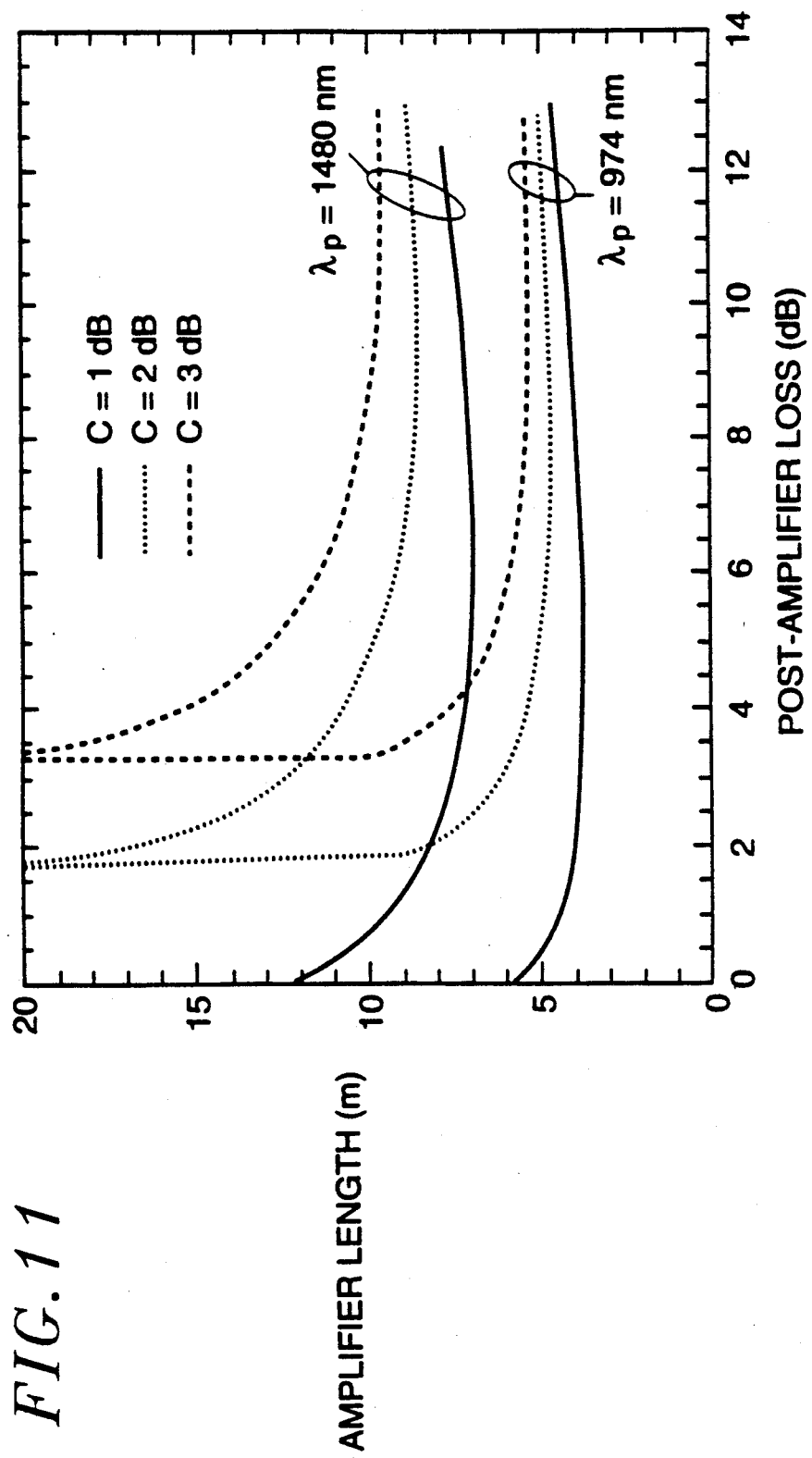

FIGS. 8–11 depict design considerations for the amplifier arrangement of FIG. 4 with either co-propagating or counter-propagating pump signals and with either long or short wavelength pump signals. FIG. 8 shows the variation of noise figure as a function of compression and post-amplifier loss L using long wavelength pump signals in the optical amplifier element. FIG. 9 shows the variation of noise figure as a function of compression and post-amplifier loss L using short wavelength pump signals in the optical amplifier element. FIG. 10 shows the variation of pump power as a function of compression and the post-amplifier loss L. FIG. 11 shows the variation of amplifier length as a function of compression and the post-amplifier loss L. For all the FIGS. 8–11, it is understood that the amplifier arrangement is specified to a gain of 7 dB with an output power $P_{s,out}$ of −10 dBm which are common parameters for soliton transmission systems. Similar characteristic curves are derivable for NRZ transmission systems.

Operation of the optical amplifier element in compression reduces signal power fluctuations in the system. Introduction of post-amplifier loss reduces signal power fluctuations only by an insignificant amount. Post-amplifier loss provides a significant impact on system robustness in the presence of systematic deviations in pump power, amplifier length, and interamplifier loss for a system having cascaded amplifiers as shown in FIG. 1. These deviations result from pump laser aging, systematic manufacturing imperfections, and design errors. It has now been found that the use of the amplifier in FIG. 4 in the system of FIG. 1 permits the overall system to operate closer to the system designed power level than is possible with the prior art optical amplifiers of FIG. 2.

Prior art optical amplifiers continue to be designed in ways which minimize the loss in the amplifier. This design approach requires more stringent fabrication and device tolerances. In contrast with the prior art, the present invention shows that it is possible to introduce significant loss and different operating conditions for amplifier in ways which are contrary to the prior art teachings. The present invention by virtue of the post-amplification loss and different operating conditions exhibits an improved noise performance while allowing more relaxed fabrication and operating requirements on the component elements of the invention.

What is claimed is:

1. Optical apparatus for amplifying an input lightwave signal to a desired optical power level, the optical apparatus comprising, an optical amplifier responsive to a pump signal at a first level for producing a predetermined gain to amplify the input lightwave signal, means coupled to the optical amplifier for pumping the optical amplifier with a pump signal at a second level greater than the first level to cause a predetermined increase of the optical amplifier gain, and means coupled to an output of the optical amplifier for causing a loss substantially equal in magnitude to the predetermined increase of the optical amplifier gain.

2. The optical apparatus as defined in claim 1 further including an optical isolator coupled between the optical amplifier and the means for causing the loss.

3. The optical apparatus as defined in claim 1 wherein the optical amplifier is selected from the group consisting of doped fiber amplifiers and semiconductor amplifiers.

4. The optical apparatus as defined in claim 3 wherein the doped fiber amplifiers include erbium doped fiber amplifiers.

5. The optical apparatus as defined in claim 4 wherein the means for pumping includes means for generating an optical pump signal at a predetermined pump wavelength.

6. The optical apparatus as defined in claim 1 wherein the means for causing the loss introduces substantially no nonlinear distortion to the lightwave signal propagating therethrough.

7. Optical apparatus for amplifying an input lightwave signal to a desired optical power level, the optical apparatus comprising:

an optical amplifier responsive to a pump signal for amplifying the input lightwave signal to a level exceeding the desired level by a predetermined amount, and means for attenuating by substantially the predetermined amount an amplified signal from an output of the optical amplifier to produce an output lightwave signal substantially at the desired optical power level.

8. The optical apparatus as defined in claim 7 further including an optical isolator coupled between the optical amplifier and the means for causing the loss.

9. The optical apparatus as defined in claim 7 wherein the optical amplifier is selected from the group consisting of doped fiber amplifiers and semiconductor amplifiers.

10. The optical apparatus as defined in claim 9 wherein the doped fiber amplifiers include erbium doped fiber amplifiers.

11. The optical apparatus as defined in claim 10 wherein the means for pumping includes means for generating an optical pump signal at a predetermined pump wavelength.

12. The optical apparatus as defined in claim 7 wherein the means for causing the loss introduces substantially no nonlinear distortion to the lightwave signal propagating therethrough.

13. Method for optically amplifying a lightwave signal to produce an output lightwave signal at a desired optical power level, the method comprising the steps of:

pumping an amplifying gain medium to cause substantially uniform population inversion of the amplifying gain medium;

amplifying the lightwave signal via the amplifying gain medium to produce an amplified lightwave signal having an optical power level exceeding the desired optical power level substantially by a predetermined amount; and attenuating the amplified lightwave by substantially the predetermined amount to produce an output lightwave signal substantially at the desired optical power level.

14. A lightwave transmission system comprising a plurality of optical apparatus for amplifying an input lightwave signal to a desired optical power level and a corresponding plurality of lightwave transmission media for interconnecting the said optical apparatus together in a concatenated fashion, each said optical apparatus comprising:

an optical amplifier responsive to a pump signal for amplifying the input lightwave signal to a level exceeding the desired level by a predetermined amount, and means for attenuating by substantially the predetermined amount an amplified signal from an output of the optical amplifier to produce an output lightwave signal substantially at the desired optical power level.

15. The optical apparatus as defined in claim 14 further including an optical isolator coupled between the optical amplifier and the means for causing the loss.

16. The optical apparatus as defined in claim 14 wherein the optical amplifier is selected from the group consisting of doped fiber amplifiers and semiconductor amplifiers.

17. The optical apparatus as defined in claim 16 wherein the doped fiber amplifiers include erbium doped fiber amplifiers.

18. The optical apparatus as defined in claim 17 wherein the means for pumping includes means for generating an optical pump signal at a predetermined pump wavelength.

19. The optical apparatus as defined in claim 14 wherein the means for causing the loss introduces substantially no nonlinear distortion to the lightwave signal propagating therethrough.

20. Optical apparatus for amplifying an input lightwave signal to a desired optical power level, the optical apparatus comprising, an optical amplifier responsive to a pump signal for amplifying the input lightwave signal, means coupled to the optical amplifier for pumping the optical amplifier with a pump signal at a higher level than the level necessary to achieve the desired level at an optical amplifier output, and means coupled to the output of the optical amplifier for attenuating an output lightwave signal from the optical amplifier so that the desired optical power level is achieved.

\* \* \* \* \*